United States Patent [19]

Diaz et al.

[11] 4,419,156

[45] Dec. 6, 1983

[54] METHOD OF ENCAPSULATION

[75] Inventors: Stephen H. Diaz, Los Altos Hills; David A. Horsma, Palo Alto, both of Calif.

[73] Assignee: Raychem Corporation, Menlo Park, Calif.

[21] Appl. No.: 903,961

[22] Filed: May 8, 1978

Related U.S. Application Data

[63] Continuation-in-part of Ser. No. 798,130, May 18, 1977.

[51] Int. Cl.$^3$ ............................................. B60B 9/10
[52] U.S. Cl. ..................................... 156/49; 264/27; 264/230; 264/271.1
[58] Field of Search ..................... 156/49; 264/25, 259, 264/272, DIG. 46, 230, 27, 271.1, 279, 279.1; 174/DIG. 8, 84 R; 29/857, 858, 859, 870, 862, 863, 860, 867, 868

[56] References Cited

U.S. PATENT DOCUMENTS

| | | | |
|---|---|---|---|
| T905001 | 12/1972 | Day | 264/27 |
| 2,695,853 | 11/1954 | Foreit | 264/27 |
| 2,930,835 | 3/1960 | Bollmeier | 156/49 |
| 3,235,289 | 2/1966 | Jones | 156/49 |
| 3,277,048 | 12/1973 | Traut | 156/49 |
| 3,361,605 | 1/1968 | Gilbert | 156/49 |
| 3,396,460 | 8/1968 | Wetmore | 264/230 |
| 3,467,561 | 9/1969 | Waride | 156/49 |
| 3,576,387 | 4/1971 | Derby | 174/36 |
| 3,576,933 | 4/1971 | Bates et al. | 264/347 |
| 3,769,120 | 10/1973 | Chandler | 264/342 R |
| 3,787,607 | 1/1974 | Schlafly | 156/49 |
| 3,878,317 | 4/1975 | Plaskon et al. | 174/92 |
| 3,889,047 | 6/1975 | Carver | 174/84 R |
| 3,951,712 | 4/1976 | Nakata | 156/49 |
| 3,996,455 | 8/1968 | Sherlock | 29/498 |
| 4,084,307 | 4/1978 | Schultz et al. | 264/342 R |

FOREIGN PATENT DOCUMENTS

| | | |
|---|---|---|
| 1105024 | 2/1960 | Fed. Rep. of Germany . |
| 1460418 | 7/1969 | Fed. Rep. of Germany . |
| 39-41668 | 7/1964 | Japan . |
| 48-13308 | 4/1973 | Japan ..................... 156/49 |
| 83034 | 2/1954 | Norway . |

OTHER PUBLICATIONS

Meyer, "Glass Transition Temperature as a Guide to Selection of Polymers . . . ," Polymer Eng & Science, vol. 13, #6 (1973) pp. 462-468.
Schmidt et al., Principles of High-Polymer Theory and Practice, McGraw-Hill, N.Y. (1948), p. 307.
Simonds et al., Handbook of Plastics, Van Nostrand, N.Y. (1944) pp. 207 & 963.
Diaz; Stephen SN-638,440 Specification (for U.S. Patent Application) filed 12/8/75.
Horsma et al. SN-601,638 Specification (for U.S. Patent Application) Effective Date Sep. 1974.
Harmek et al. Textile Mfr. (1-1943) "Treatment of Fabrics".
Anon. Du Pont Bul D262 (6-1972) "Printing and Finishing Fabrics of Dacron Polyester".

Primary Examiner—Willard E. Hoag
Attorney, Agent, or Firm—Lyon & Lyon

[57] ABSTRACT

A method of encapsulating a substrate, especially a splice in a telephone cable, comprises (1) preparing an assembly comprising the substrate; an enclosure, preferably a heat-shrinkable enclosure, around the substrate; sealing material within the enclosure; and a heater within the enclosure; and (2) using said heater to change the viscosity of the sealing material. Preferably the heater is a PTC heater, especially one which is attached to thermoplastic sealing material in the form of a sheet or tape. In this way a desired distribution of heat through the assembly can be obtained so that extended heating times can be used.

11 Claims, 7 Drawing Figures

39 CORRUGATED ALUMINUM ELECTRODE
37 PTC CONDUCTIVE POLYMER LAYER
38 CORRUGATED ALUMINUM ELECTRODE

METHOD OF ENCAPSULATION

CROSS REFERENCE TO RELATED APPLICATIONS

This application is a continuation-in-part of our application Ser. No. 798,130 filed May 18, 1977.

BACKGROUND OF THE INVENTION

1. Field of the Invention

This invention relates to a method of encapsulating a part of a substrate, especially the splice area of a telephone cable.

2. Summary of the Prior Art

It is common practice to provide a waterproof encapsulation around a part of a substrate by means of a sealing material which flows around the substrate during the encapsulation process, but is relatively viscous in the final product. Since the sealant must be sufficiently liquid to flow around the substrate, it must be confined by a closure member, which is frequently heat-shrinkable. In many cases, the encapsulation process requires the use of heat to change the viscosity of the sealing material, for example by melting a fusible solid so that it can flow into sealing contact with the substrate or by curing a two-part liquid curing system. Two methods have been used or proposed for use to supply such heat to the sealing material. The first, which is widely used in practice, is to heat the whole assembly externally so that the sealing material is heated by a combination of convection and conduction. The second, which is described in U.S. Pat. No. 3,396,455, makes use of infra-red radiation in combination with a heat-shrinkable sleeve as the closure member, the sleeve absorbing part of the radiation so that it is heated to its shrinkage temperature, but transmitting sufficient of the radiation to fuse an infrared absorptive insert within the sleeve. A disadvantage of both these methods is that when extended heating is required, for example in order to melt a large quantity of sealant when encapsulating a telephone cable splice, it is difficult to avoid damaging one or more of the components of the assembly, because the exterior of the assembly reaches a much higher temperature than the interior. This problem is particular apparent when encapsulating a splice comprising a cable having a thermoplastic insulating jacket, e.g. of polyethylene or another polyolefin.

SUMMARY OF THE INVENTION

We have now discovered that by using a heater which is placed inside the assembly, the distribution of heat in the assembly can be much better controlled, thus minimising the danger of generating excessively high temperatures which damage one of the components of the assembly. In one aspect, therefore, the invention provides a method of encapsulating a part of a substrate, which method comprises (1) preparing an assembly comprising
 (a) a substrate;
 (b) a closure member which forms an enclosure around a part of the substrate and which has at least one aperture of closed cross-section through which the substrate passes;
 (c) a heater within said enclosure; and
 (d) sealing material within said enclosure;

(2) supplying heat to said assembly, at least in part from said heater, to change the viscosity of said sealing material; and
(3) cooling said assembly;

said sealing material (a) having, before and/or during step (2), a viscosity such that it flows into sealing contact with at least part of the substrate within the enclosure, and (b) being waterproof and having a substantially higher viscosity after step (3).

DETAILED DESCRIPTION OF THE INVENTION

Figure 1:
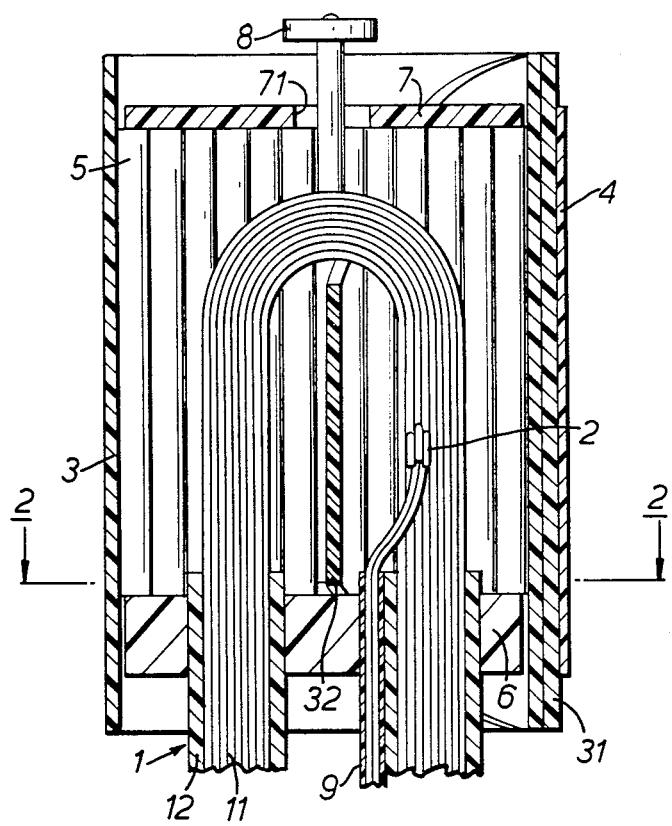
FIG. 1 is a cross-section in elevation of an assembly for encapsulation of a butt splice (also known as a pedestal splice) before the heating step.

The invention is of particular value for encapsulating splices in electrical cables, especially telephone cables, including both air-core telephone cables and filled telephone cables, i.e. cables which are filled with a sealing material, e.g. a grease-like petrolatum, to resist the entry of water into the cable. Such cable splices usually comprise at least two joints (and often very many more) between insulated electrical conductors, each joint comprising an insulating sleeve which overlies (but does not have a waterproof seal to) the insulating jackets on the conductors, the conductors being crimped together within the sleeve. The known methods for sealing such splices are not entirely satisfactory, and we have discovered that a frequent cause of failures is the presence of voids in the sealing material around the joints. Thus, when a void includes two joints, moisture can accumulate in the void and penetrate between the insulating sleeve and the insulating jacket and thus cause shorting.

In the present invention, the sealant is preferably heated so that the volume of gases trapped between the sealing material and the substrate is substantially reduced. When (as in a telephone cable splice) the substrate comprises a plurality of joints as described above, the sealing material is preferably heated for a time such that it forms a waterproof seal around each of the joints. Particularly good results are obtained when the heating causes air initially trapped within the sleeve to expand, so that some of it is expelled, and sealing material is sucked between the sleeve and the jacket when the assembly is cooled. Preferably the heating is continued for a time such that substantially all the gases trapped within the sealing material escape to the surface thereof. The assembly may be open at the top, or the closure member can have a vent hole in the upper portion thereof, to vent gases escaping from the sealing material; however, it should be noted that the presence of gases within the assembly may not be harmful provided they do not create voids between parts of the substrate which should be separated by sealing material.

The closure member is preferably at least in part heat-shrinkable, and is heated to its shrinkage temperature before or during step (2) of the process. The closure member may be a monolithic structure, for example a generally tubular member which may have one or two conical end sections through which the substrate passes. Alternatively it may comprise two or more parts which are sealed together during the encapsulation process, for example two heat-shrinkable parts or one heat-shrinkable part and one or more non-heat-shrinkable parts, which together form an enclosure, for example a generally cylindrical enclosure. In many cases it is desirable that the closure member should be of the wrap-around type, i.e. one which does not require the substrate to have a free end. One or more of the parts may be pre-shaped, but preferably at least part of the closure member is one which can be cut to size on site, e.g. a simple sheet material. It is often useful to place a coating of a hot-melt adhesive on the surfaces of the closure member which contact the substrate, and/or on the surfaces of separate parts of the closure member which are joined together to form the enclosure, to give improved mechanical strength and sealing at these points. Part of the enclosure can be created in situ by means of tape which is wrapped around the substrate.

An essential feature of this invention is that heat should be generated by a heater within the enclosure. There can be two or more heaters, which can be the same or different, placed in different parts of the enclosure to generate desired amounts of heat, either simultaneously or at different times. Preferably the heater is an electrical resistance heater, generally one which in step (2) is connected to an external source of power, e.g. a 110 volts AC source or one or more batteries, though the possibility of using a built-in battery is not excluded. Preferably the heater comprises means for controlling the maximum temperature thereof, in order to prevent damage to any part of the assembly, while ensuring that sufficient heat is supplied to effect the desired change in the sealing material and, when the closure member is heat-shrinkable and is shrunk during step (2), to shrink the closure member. Such controlling means is preferably an element which exhibits positive temperature coefficient (PTC) behaviour with a switching temperature ($T_S$) such that the heater automatically shuts off at an appropriate temperature. The $T_S$ is typically between 50° and 110° C., preferably 60° to 90° C., and the heater will generally shut off at a temperature 10° to 60° C. higher than $T_S$. Suitable heaters include those which comprise an element comprising an organic polymer and electrically conductive particles, generally carbon black, dispersed therein in amount sufficient to render the member electrically conductive. A number of such heaters are well known in the art. Preferably the heater is a layered heater as described in German OLS No. 2 543 314 (equivalent to U.S. Ser. No. 601,638, now U.S. Pat. No. 4,177,376). Certain carbon-loaded PTC materials shut off at different temperatures at different voltages (see in particular copending application Ser. No. 732,792 by Peter van Konynenburg et al and application Ser. No. 798,154 by David Horsma) and by varying the voltage supplied to a heater comprising such a composition, a desired time/power output profile can be obtained, for example first to effect a desired change in the sealing material and then to shrink the closure member.

The insulating jacket on the heater should of course be one which is not destroyed by the sealing material itself or anything else in the enclosure, for example the filler in a filled cable.

The heater is preferably placed in the assembly so that at least part of it is separated from the closure member by the sealing material. In this way a more umiform distribution of heat within the enclosure can be obtained. We have obtained particularly good results using a PTC strip heater which is wound around, and where appropriate through, the substrate and sealing material. Where a heat-shrinkable closure member is used, and the temperature required for efficient shrinkage is higher than the temperature to which the bulk of the sealing material is preferably heated, it is often desirable to use a first heater attached to the heat-shrinkable closure member and a second heater in the sealing material, the first heater shutting off at a higher temperature than the second, e.g. at least 5° C. higher, preferably 5° to 25° C. higher. A particularly preferred heater is a heater as described in U.S. Ser. No. 873,676 by David Horsma, especially one which comprises (a) at least two electrodes;
(b) at least one PTC element which is composed of a PTC composition having a useful $T_s$ of 0° to 280° C. and which surrounds and physically contacts substantially the whole of the surface of one of said electrodes;
(c) at least one relatively constant wattage (RCW) element which surrounds said electrodes and PTC element and which makes physical contact with said PTC element; and
(d) at least one current-directing (CD) element;

said electrodes and said PTC, RCW and CD elements being so arranged that, when the electrodes are connected to a source of electrical power while the device is below its operating temperature or substantially immediately after such connection, the current path passes through at least one PTC element and at least one RCW element, with the resistance of that current path being greater than the resistance of the current path which would be adopted if the CD element was replaced by an element of the same shape but composed of the same composition as that RCW element.

In another embodiment the heater is a laminar heater, at least part of which is secured to the inner face of the closure member, preferably a heater comprising a laminar conductive polymer member and a pair of laminar flexible electrodes which (i) are connected to opposite faces of said member; (ii) are substantially parallel to said member; and (iii) are adapted to be connected to an external source of electrical power to cause current to pass through said laminar member. When the closure member is heat-shrinkable, and such a heater is used, preferably at least the part thereof which is attached to the closure member has a plurality of apertures through the thickness thereof, the apertures being of elongated closed cross-section and overlapping one another to permit at least one of the dimensions of the heater in the plane thereof to be changed in the direction of shrinkage by a change in the shape of the apertures. For further details of such heaters and heat-shrinkable components comprising them, reference should be made to German OLS No. 2 655 543 (corresponding to U.S. Ser.

No. 638,440 now abandoned in favor of continuation-in-part application Ser. No. 775,882).

The sealing material is preferably a material whose viscosity is substantially reduced by heating (but which is preferably otherwise unchanged), so that at a temperature below that which can damage the substrate, e.g. 60° to 110° C., it will flow into sealing contact with the substrate, and on subsequent cooling will form a high viscosity seal, preferably a resilient seal, between the closure member and the substrate. Such material is referred to herein as fusible sealing material. Such fusible material may be packed around the substrate at ambient temperature, while it is solid (i.e. is sufficiently viscous to remain substantially in the packed position while the aseembly is prepared), e.g. in the form of tape, granules or rods. Alternatively it may be preheated and poured or pumped into the enclosure. As fusible sealing materials we have used a blend of an ethylene/vinyl acetate copolymer and a wax, which blend has a very low viscosity when heated but is somewhat brittle when cooled. We have also used a blend of a styrene/isoprene copolymer and a tackifier, which blend has a somewhat higher viscosity when heated but has desirable rubbery properties.

Preferably the sealing material has, after step (3), a Durometer hardness of 10 to 100, especially 20 to 60.

The sealing material preferably has, while it is flowing into sealing contact with the substrate, a viscosity from 20,000 to 2,000,000 centipoises, with viscosities from 25,000 to 1,000,000 centipoises, especially 30,000 to 600,000 centipoises, being preferred for encapsulating telephone splices. If the viscosity of the sealing material is too low it tends to leak excessively from the enclosure unless care is taken to seal the aperture thereof round the substrate before the material has such a low viscosity (though it should be noted that some leakage is permissible). If its viscosity is too high, the sealing material will not flow satisfactorily around the substrate; the more complex the shape of the substrate, the lower the viscosity preferably used. Generally it is desirable, when fusible sealing material is used, that it should be heated to a temperature of 60° to 120° C., preferably 80° to 100° C. After the encapsulation process is complete, the sealing material should have a relatively high viscosity, for example at least 1,000,000 centipoises, preferably at least 2,000,000 centipoises, especially at least 6,000,000 centipoises, at 0° C. and preferably at 55° C.

When a fusible sealing material is used in conjunction with a heat-shrinkable closure member, and especially when the enclosure becomes hermetically sealed around the substrate, it is preferred that the enclosure should comprise a vent through which excess fused sealing material can escape (together with released air).

Particularly preferred for use in the present invention is an article which comprises a shaped article of fusible sealing material, preferably a flexible sheet or tape, and a PTC heater attached to said shaped article. Such an article is in itself new and as such forms part of the present invention. The fusible sealing material and PTC heater are preferably as described above. When the PTC heater is a strip heater it can be arranged in a rectilinear or curvilinear pattern which will give the desired distribution of heat, and which will preferably accommodate itself to flow of the material and any change in shape of the enclosure. By use of such an article, close control can be exercised over the placing of the heater in the assembly and the heat output of the heater in relation to the amount of sealing material.

When a fusible sealing material is packed around the substrate prior to the heating step, it is often desirable that the assembly should comprise means for indicating when all the sealing material has fused. Such means may comprise a temperature-sensing device, e.g. a thermometer, a thermostat, or a PTC sensing device, in contact with the sealing material, preferably at one of the points most remote from the heater. Alternatively the assembly comprises one or more bodies which are placed in the solid sealing material, preferably at the points most remote from the heater, and which float to the top of the material when it has fused.

An advantage of using a fusible sealing material is that the splice case (or other enclosure) can be reentered by heating.

In another embodiment, the sealing material is added to the enclosure as a liquid mixture which flows into sealing contact with the substrate and is subsequently converted by heat into a high viscosity sealant, for example a polyurethane precursor mixture which is cured by heat, or a plastisol or organosol or other composition which undergoes phase inversion when heated.

Especially for encapsulating electrical components, the sealing material should preferably be an electrical insulator, this term being used to include materials which are sometimes regarded as semi-conductive, e.g. having a resistivity greater than $10^2$ ohm.cm. Preferably the resistivity of the material is greater than $10^5$ ohm.cm. The material should preferably wet the substrate well and, when the substrate is a filled cable, be compatible with the filler in the cable.

The sealing material may comprise a dessiccant to control moisture vapor transmission therethrough, and this is an additional novel feature of the invention. It should be noted, however, that although the sealing material must be an effective barrier to liquid water, it need not be (and in the absence of dessicant generally is not) an effective barrier to water vapor.

In carrying out the process of the invention, a substantial proportion of the heat used to change the viscosity of the sealing material should be provided by the heater or heaters within the enclosure. When no external heating is used it is usually desirable to provide thermal insulation on the outside of the assembly to minimise heat losses. When external heating is used in addition to the internal heating, it may provide as much as 90% of the total heat required to change the viscosity of the sealing material and (where appropriate) to shrink the closure member. Generally, however, the proportion of external heat will be smaller, preferably less than 50%, especially less than 30%. Any form of external heating can be used, but when using a heat-shrinkable closure member a preferred external heater is one which will itself shrink so that it remains in physical contact with the closure member.

As noted above, the invention is of particular value when extended heating times are required. Thus during the process the heater within the enclosure will generally supply heat for at least 5 minutes, usually at least 10 minutes, often at least 20 minutes, e.g. 30 to 60 minutes when encapsulating a cable slice having a spliced bundle diameter of 0.75 inch or more.

In the process of the invention, shrinkage of the closure member preferably not only results in the formation of the desired enclosure but also has the effect of pumping the low viscosity sealing material around the substrate and into any interstices therein, especially between and around the individual joints between conductors within a multi-core cable.

Figure 2:
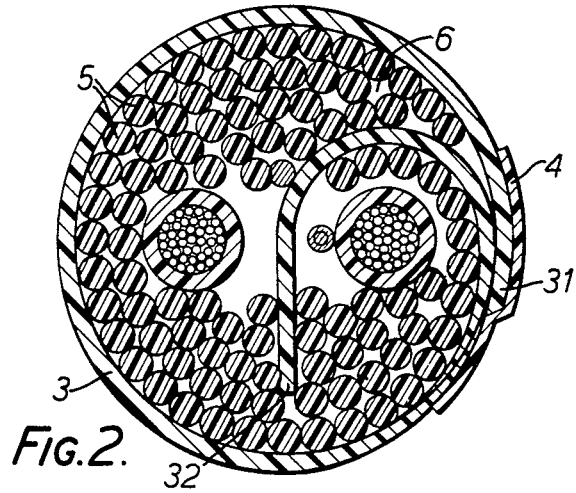
FIG. 2 is a cross-section in plan taken on line 2—2 of FIG. 1.
Figure 3:
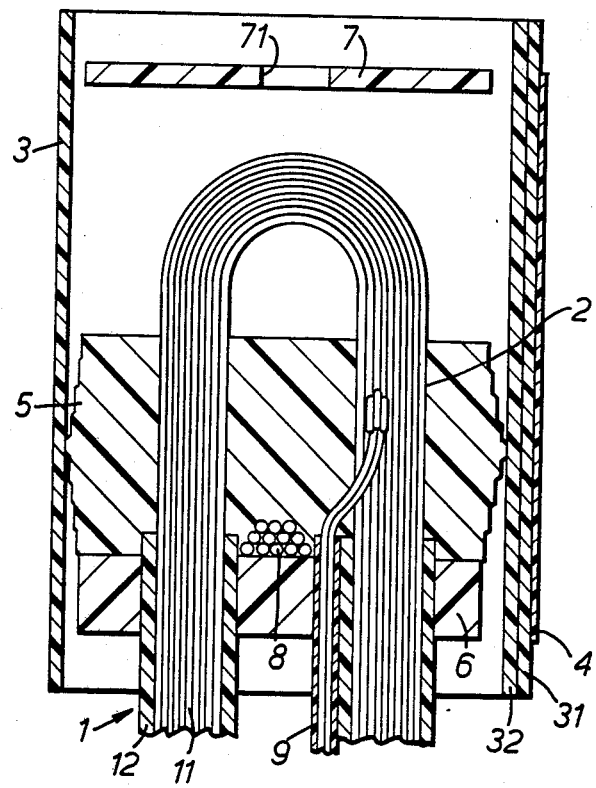
FIG. 3 is a cross-section in elevation of another assembly for partial encapsulation of a butt splice before the heating step of the process of the invention.

Referring now to FIGS. 1, 2 and 3, a distribution telephone cable 1 having an outer insulating jacket 12 contains a plurality, e.g. 50–250, of pairs of individual conductors 11. A subscriber cable 9 contains a much smaller number of pairs, e.g. 2 pairs, which are spliced to individual pairs of the cable 1, as shown at 2. A dam 6, which forms the base of the enclosure, is placed around cables 1 and 9 below the point at which the outer insulation jacket has been removed, e.g. by wrapping a suitable high-melting tape between and around them. Solid sealing material 5 (in the form of rods in FIGS. 1 and 2, and in the form of wrapped tape in FIG. 3) is placed around the parts of the cables to be encapsulated.

Figure 7:
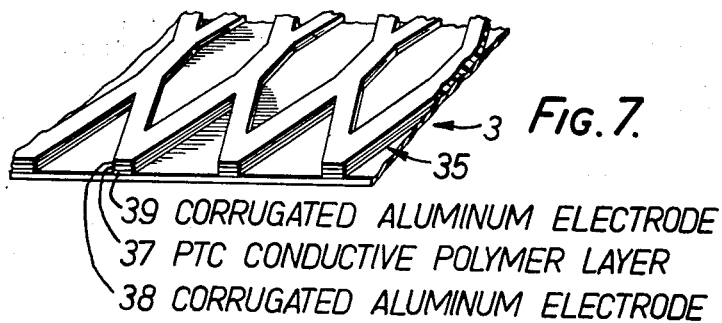
FIG. 7 is an isometric view partly in cross-section of a part of a heat-shrinkable enclosure for use in the present invention.

The solid sealing material preferably extends a little way beyond the periphery of the dam 6. A disc 7 having an aperture 71 therein is placed on top of the sealing material, and forms the top of the enclosure. A heat-shrinkable polymeric sheet 3 having an expandable heater as described above attached to the inner surface thereof (as shown in detail in FIG. 7) is wrapped around dam 6, disc 7 and sealing material 5, and is secured in place by a strip of adhesive tape 4 placed on the end 31 of the sheet, thus completing the enclosure.

FIGS. 1 and 2 also show the other end 32 of the sheet 3 tucked into the center of the sealing material for greater heating efficiency, and a temperature-sensing device 8.

FIG. 3 also shows colored balls 8 placed at the bottom and center of the sealing material. These balls float to the surface of the sealing material when melting thereof is complete.

When the assembly as shown in FIGS. 1, 2 and 3 has been prepared, the expandable heater is attached to an external source of power for a sufficient length of time first to shrink the sheet 3 and then to melt the sealing material and to allow gases trapped therein to escape. The assembly is then allowed to cool.

Figure 4:
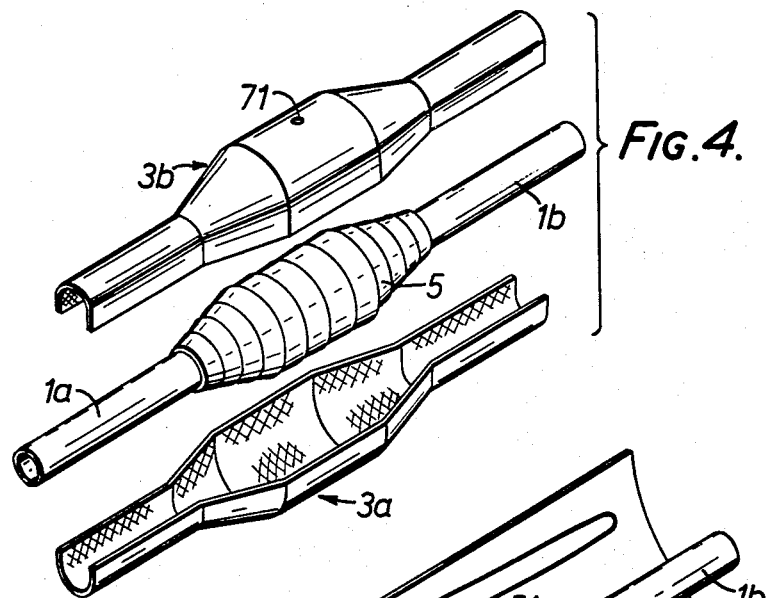
FIG. 4 is an isometric view of an assembly for encapsulation of a straight splice before the heating step of the process of the invention.
Figure 5:
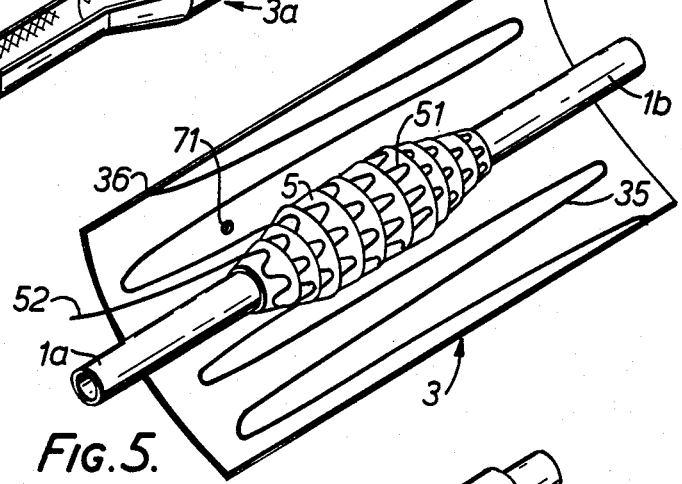
FIG. 5 is an isometric view of a step in the preparation of another assembly for encapsulation of a straight splice before the heating step of the process of the invention.
Figure 6:
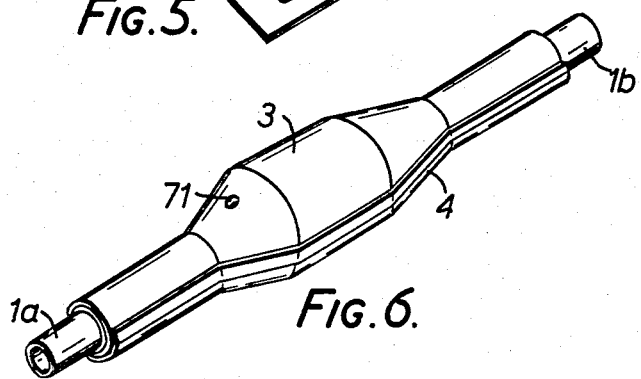
FIG. 6 is an isometric view of the assembly of FIG. 5 after the heating step.

Referring now to FIGS. 4, 5 and 6, a straight splice between telephone cables 1a and 1b has fusible sealing material 5 wrapped around and between the joints between the telephone wires. As shown in FIG. 5, sealing material 5 may be in the form of a tape with a PTC strip heater 51 impressed into the surface thereof and having end portion 52 for connection to a source of electrical supply. Strip heater 51 is arranged in a sinuous pattern. Preferably the wires are spliced in groups, each group being wrapped with sealing material before the next group is spliced. A heat-shrinkable enclosure is then placed around the wrapped splice, the enclosure having a vent hole 71 in the upper surface thereof. In FIG. 4 the enclosure is made by two mating heat-shrinkable moulded parts 3a and 3b having an expandable heater as described above attached to the inner surface thereof. In FIG. 5 the enclosure is made by wrapping a heat-shrinkable sheet 3 around the wrapped splice, and securing the overlapping edges together. Attached to sheet 3 is PTC strip heater 35 arranged in a sinuous pattern, with end portion 36 for connection to a source of electrical supply. A thermally insulating blanket (not shown) is then placed around the assembly, and the heaters or heaters connected to an electrical power supply for a sufficient length of time to melt the sealing material so that it encapsulates each of the joints and to shrink the enclosure. Air initially trapped within the sealing material escapes to the upper surface thereof and is vented through vent 71, and molten sealing material is also extruded through vent 71 as the enclosure shrinks.

A PTC strip heater could be used in place of the expandable heater shown in FIG. 4. Preferably the enclosure is provided with a connection device for electrically connecting the heaters to a source of supply, so that they are wholly within the enclosure.

The entire disclosures of the prior patents and applications referred to above are incorporated by reference in this specification.

We claim:

1. A method of encapsulating a cable splice between at least two electrical cables, said cable splice comprising at least two joints between insulated electrical conductors, each joint comprising an insulating sleeve which overlies the joint and the insulation of the joined-together conductors, the method comprising the steps of
    (1) preparing an assembly by the steps of
        (a) enveloping said cable splice within a closure member which forms an enclosure around the cable splice and which has at least one aperture of closed cross-section through which passes at least one of the cables forming that cable splice; and
        (b) placing sealing material and a heater within said enclosure, the heater being wound around and through the sealing material and the joints between the insulated conductors;
    (2) supplying heat to said assembly, at least in part from said heater, to change the viscosity of said sealing material and maintaining the sealing material at an elevated temperature for a sufficient time that if forms a waterproof seal around substantially all the joints; and
    (3) cooling said assembly;
said sealing material (a) having, at a stage before completion of step (2), a viscosity such that it flows between and around and into sealing contact with substantially all of the joints of the cable splice within the enclosure, and (b) being substantially waterproof and having a substantially higher viscosity after step (3).

2. A method according to claim 1 wherein the insulation of the joined-together conductors is composed of thermoplastic material.

3. A method according to claim 1 wherein said sealing material is a solid whose viscosity is substantially reduced in step (2) but which is otherwise unchanged, whereby the encapsulated cable splice can be reentered by heating thereof to melt the sealing material.

4. A method according to claim 1 wherein said sealing material is added to the enclosure as a liquid.

5. A method according to claim 1 wherein said closure member is heat-shrinkable and is shrunk in step (2).

6. A method according to claim 1 wherein each joint comprises an insulating sleeve which overlies the joint and the insulation of the joined-together conductors but does not have a waterproof seal to the insulation of the joined-together conductors.

7. A method according to claim 6 wherein air which is initially trapped within said insulating sleeves is caused to expand in step (2) so that some of said air is expelled and sealing material is sucked between the insulating sleeve and the insulation of the joined-together conductors in step (3).

8. A method according to claim 1 wherein said heater comprises an element which (a) exhibits PTC behavior and (b) comprises an organic polymer and electrically conductive particles dispersed in said polymer.

9. A method according to claim 8 wherein said heater is a PTC strip heater.

10. A method according to claim 8 wherein said cable splice is between at least two telephone cables.

11. A method according to claim 10 wherein at least one of said telephone cables is a filled telephone cable.

* * * * *